US012742700B2

(12) United States Patent
Greene et al.

(10) Patent No.: US 12,742,700 B2
(45) Date of Patent: Sep. 22, 2026

(54) METHOD AND APPARATUS FOR TESTING VENT CAPS

(71) Applicant: The Boeing Company, Arlington, VA (US)

(72) Inventors: Dustin P. Greene, Aledo, TX (US); John M. Holder, Plano, TX (US)

(73) Assignee: The Boeing Company, Arlington, VA (US)

( * ) Notice: Subject to any disclaimer, the term of this patent is extended or adjusted under 35 U.S.C. 154(b) by 282 days.

(21) Appl. No.: 18/616,497

(22) Filed: Mar. 26, 2024

(65) Prior Publication Data

US 2025/0305909 A1 Oct. 2, 2025

(51) Int. Cl.
*G01M 13/003* (2019.01)
*H01M 50/325* (2021.01)

(52) U.S. Cl.
CPC ....... *G01M 13/003* (2019.01); *H01M 50/325* (2021.01); *H01M 2200/20* (2013.01)

(58) Field of Classification Search
CPC ........... H01M 2200/20; H01M 50/325; G01M 13/003
USPC ........................................................... 73/49.8
See application file for complete search history.

(56) References Cited

U.S. PATENT DOCUMENTS 11,621,455 B2 4/2023 Emery
2008/0282774 A1 * 11/2008 Green ................ G01M 3/3209 73/40

FOREIGN PATENT DOCUMENTS

KR 200408408 Y1 * 2/2006 ............ G01M 99/00

OTHER PUBLICATIONS

Translation of KR-200408408-Y1 (Year: 2006).*
Author unknown, "ULM Ultra Low Maintenance batteries for aircraft," Saft, Jan. 5, 2017, 8 pages, saft.com, accessed Mar. 18, 2024, https://saft4u.saft.com/en/product/ulmr-ultra-low-maintenance-ni-cd-batteries.
Author unknown, "Vent Valve Test Unit DC-600," Proponent Battery, 2024, 4 pages, proponent-battery.com, accessed Mar. 18, 2024, https://www.proponent-battery.com/vent-valve-tester/.

* cited by examiner

*Primary Examiner* — Nathaniel T Woodward
(74) *Attorney, Agent, or Firm* — Yee & Associates, P.C.

(57) ABSTRACT

A fixture tests operation of a plurality of battery vent caps. The fixture includes a base having recesses into which the vent caps can be placed for testing either simultaneously or sequentially. Pressurized air is supplied to the vent caps through solenoid valves in the fixture operated by a controller.

18 Claims, 12 Drawing Sheets

METHOD AND APPARATUS FOR TESTING VENT CAPS

BACKGROUND INFORMATION

1. Field

The present disclosure broadly relates to vent caps, such as those used in battery cells, and deals more particularly with a method and apparatus for testing vent cap valves.

2. Background

Typical rechargeable batteries comprise several electrochemical cells containing an anode, a cathode and an electrolyte solution. Each of the cells contains a vent cap allowing escape of gases from the cell which are often generated during battery charging. The vent caps also permit checking and filling the cells with water.

The vent caps contain a pressure responsive valve that controls the escape of gas in the cell. The valve may comprise a membrane or a spring-loaded valve member that opens when the cell gas pressure reaches a predetermined value, and closes when the gas pressure falls below a lower predetermined value. It is important to periodically check the vent caps in order to assure that the valves are opening/closing at the correct pressures in order to avoid excess pressure build-up in the cells.

In the past, in order to test vent cap operation, each vent cap is connected with a source of pressurized air and placed in a container of water. The presence of bubbles exiting the vent cap is used to visually verify that the valve is opening properly. This testing process is time-consuming and labor intensive, particularly in the case of large batteries containing many cells since the vent caps must be removed from the battery, one-at-a time, and then manually connected with a pressurized air source and placed in a container of water. Moreover, this test procedure is not robust because it does not reveal the particular pressures at which the valves open and close. Knowing the exact opening and closing pressures is useful in determining whether a valve is functioning normally.

Accordingly, it would be desirable to provide a method and apparatus for testing multiple vent caps in a group at the same time, which avoids the disadvantages mentioned above.

SUMMARY

The disclosure relates in general to battery vent caps containing valves that allow the escape of gases from the battery, and more specifically to a method and apparatus for testing valve operation in order to assure that the vent caps are in proper operating condition.

According to one aspect, apparatus is provided for testing a vent cap having a valve for controlling escape of gases. The apparatus includes a fixture having at least one recess configured to have the vent cap placed therein. The fixture also includes an inlet configured to couple the vent cap with a source of pressurized air, and an outlet coupled with the vent cap. The apparatus further includes a pressure sensor coupled with the outlet and configured to sense the pressures at which the valve opens and closes.

According to still another aspect, apparatus is provided for testing a plurality of vent caps each having a valve for controlling the escape of gas through the vent cap. The apparatus includes a fixture having a plurality of recesses in which a plurality of vent caps may be respectively placed. A plurality of inlet passages in the fixture are configured to be coupled with a source of pressurized air and are respectively coupled with the vent caps. A plurality of outlet passages in the fixture are respectively coupled with the vent caps. The apparatus also includes at least one pressure sensor coupled with the outlet passages that is configured to sense air pressure within the outlet passages indicating an opening or closing of each valve.

According to a further aspect, a method is provided of testing a plurality of vent caps, each containing a valve for controlling the escape of gas. The method comprises placing each of a plurality of vent caps on a fixture, and supplying pressurized air to each of the vent caps through the fixture. The method also includes sensing a pressure at which the valves in each of the vent caps opens and/or closes.

One of the advantages of the disclosed embodiments is that an entire group of battery vent caps can be tested substantially the same time, rather than separately. Another advantage is that multiple vent cap valves can be tested automatically without manual intervention. A further advantage is that vent cap valve opening and closing pressures can be automatically captured for archival or other purposes. Still another advantage is that the procedures for checking and maintaining batteries can be partially automated, reducing the time and labor required to verify that vent caps are operating within specified tolerances. Still another advantage is that battery vent caps can be quickly and reliably tested for proper operation, thereby avoiding the possibility undesired pressure build-up in battery cells. Another advantage is that the exact pressures at which the vent cap valves open and close can be measured and displayed.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
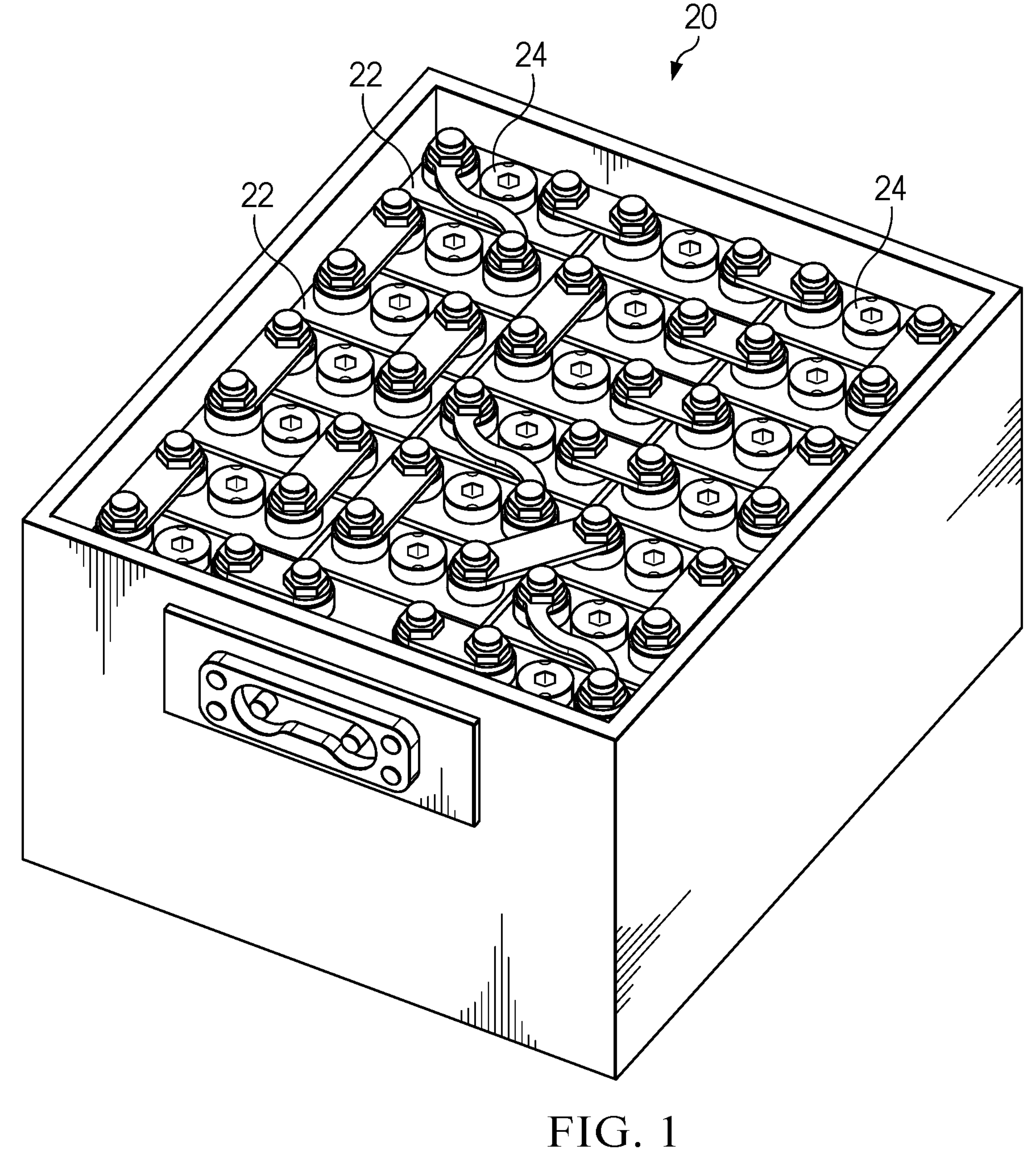
FIG. 1 is an illustration of a perspective view of a multi-cell battery containing vent caps.
Figure 2:
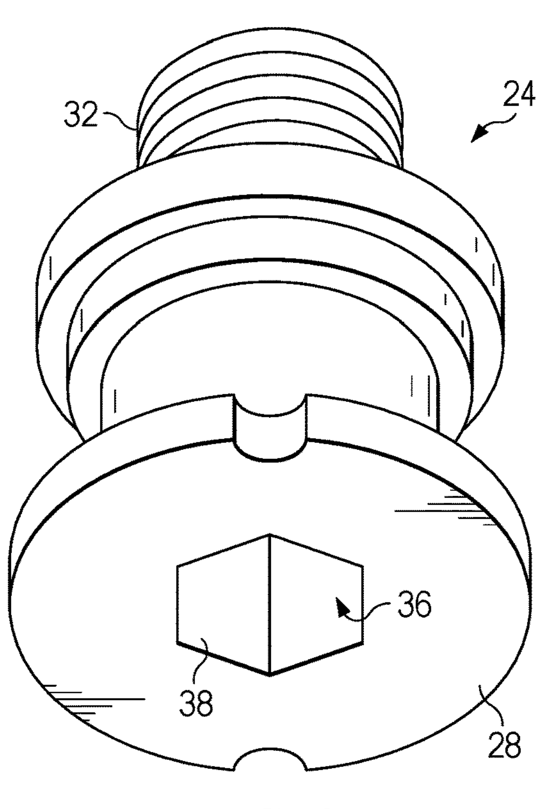
FIG. 2 is an illustration of a top perspective view of one of the vent caps shown in FIG. 1.
Figure 3:
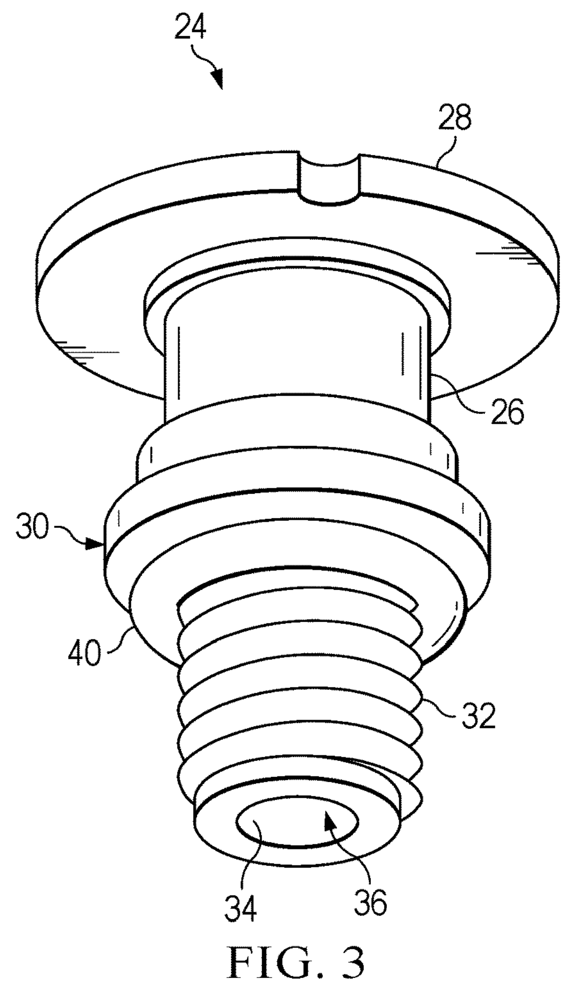
FIG. 3 is an illustration of a bottom perspective view of the vent cap shown in FIG. 2.

Referring first to FIGS. 1-3, an electrolyte battery 20 contains a plurality of electrically interconnected cells 22, each comprising an anode, a cathode and electrolyte (not shown). Each of the cells 22 also includes a vent cap 24 having a through-hole 36 from which gas within the cell 22 can escape in order to avoid excess pressure buildup in the cell 22. The vent cap 24 comprises a body 26, a threaded lower end 32 and an intermediate shoulder 30 that can be sealed against the battery 20. An O-ring 40 or similar gasket forms a seal between shoulder 30 and the battery 20 to prevent leakage of the electrolyte. The through-hole 36 includes an inlet 34 into which gas may enter from the cell 22, and an outlet 38 from which gas can escape into the surrounding environment. The threaded lower end 32 is screwed into the battery 20, allowing the vent cap 24 to be removed when desired to check and/or refill the electrolyte.

Figure 4:
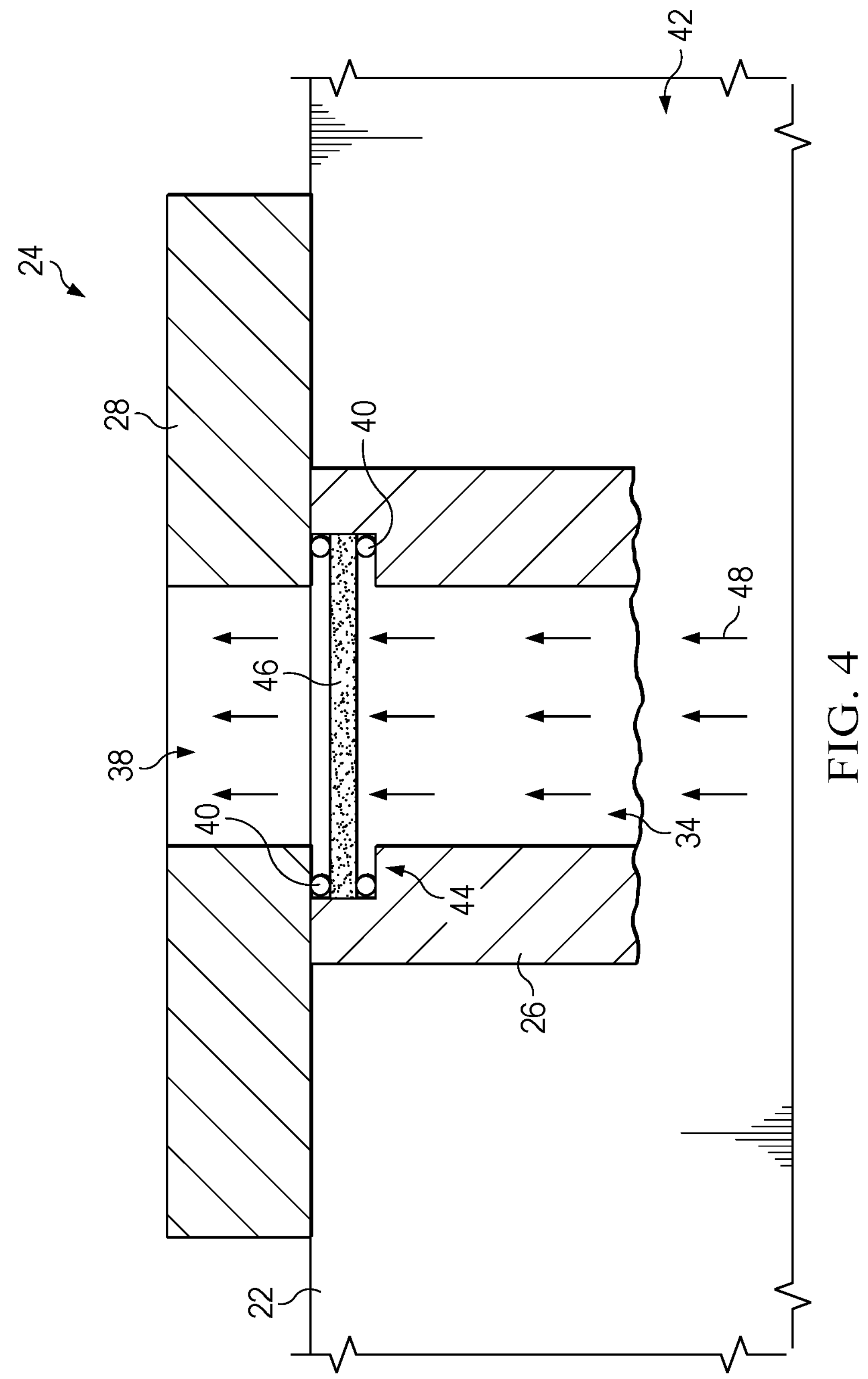
FIG. 4 is an illustration of a diagrammatic, cross-sectional view of a vent cap installed in a battery, useful in explaining the operation of a vent cap.

Referring also to FIG. 4, each of the vent caps 24 shown in FIGS. 1-4 contains an internal valve 44 located between the inlet 34 and the outlet 38. In the illustrated example, the valve 44 comprises a membrane 46, however in other examples, the valve 44 may comprise a spring-loaded closure that opens when pressure within the cell 22 exceeds a preselected value. In one application for example, the valve 44 opens at 10 psi and closes at 2 psi. Typically, the membrane 46 is mounted against one or more O-rings 40. In operation, when the gas pressure within the cell interior 42 exceeds a preselected value, the valve 44 opens, allowing gas 48 to flow from the inlet 34 out through the outlet 38, thereby relieving pressure within the cell 22. Then, when the gas pressure drops below a lower preselected value, the valve 44 closes.

Figure 5:
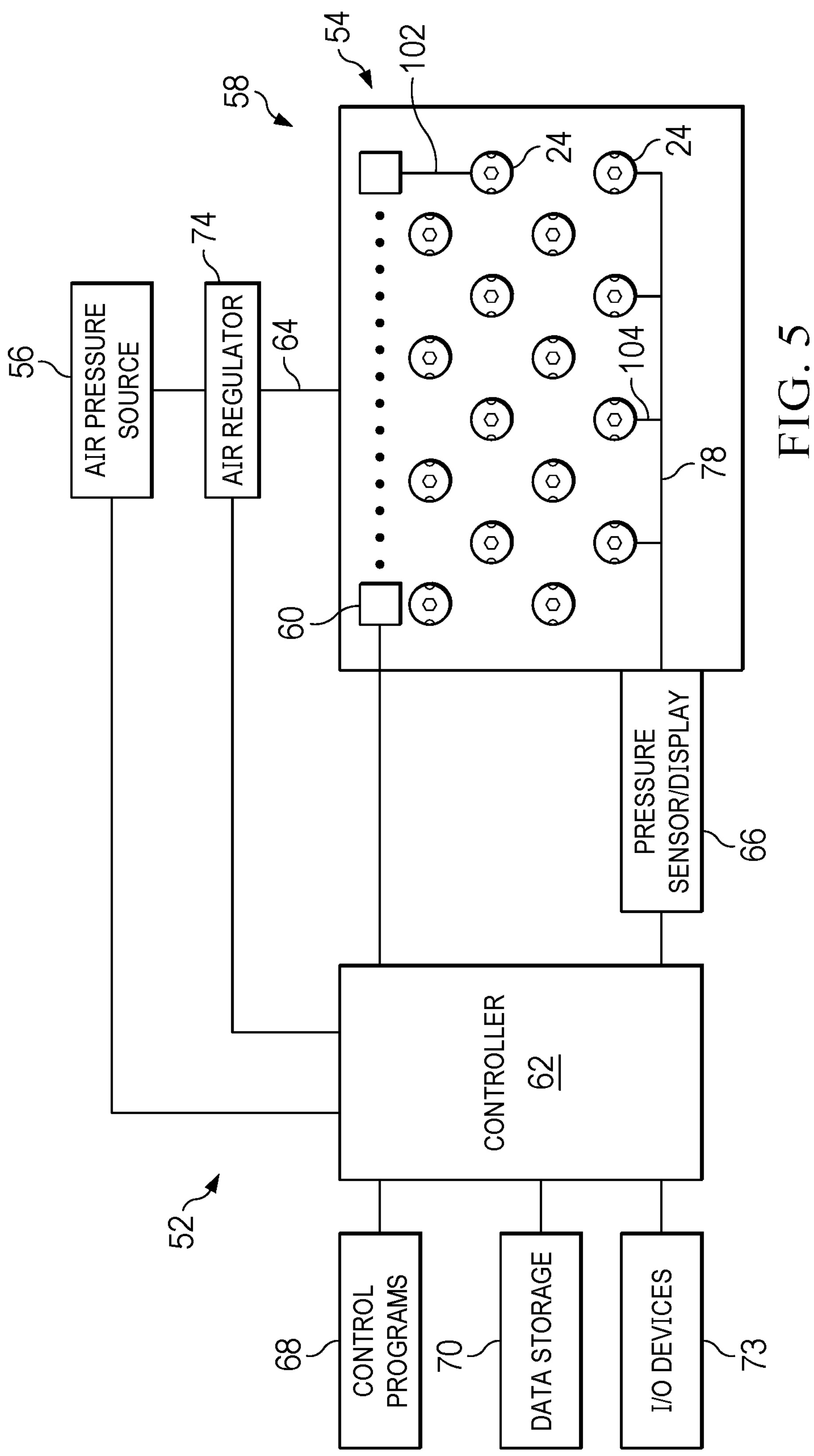
FIG. 5 is an illustration of a combined block and diagrammatic view of one example of an apparatus for testing vent caps.
Figure 6:
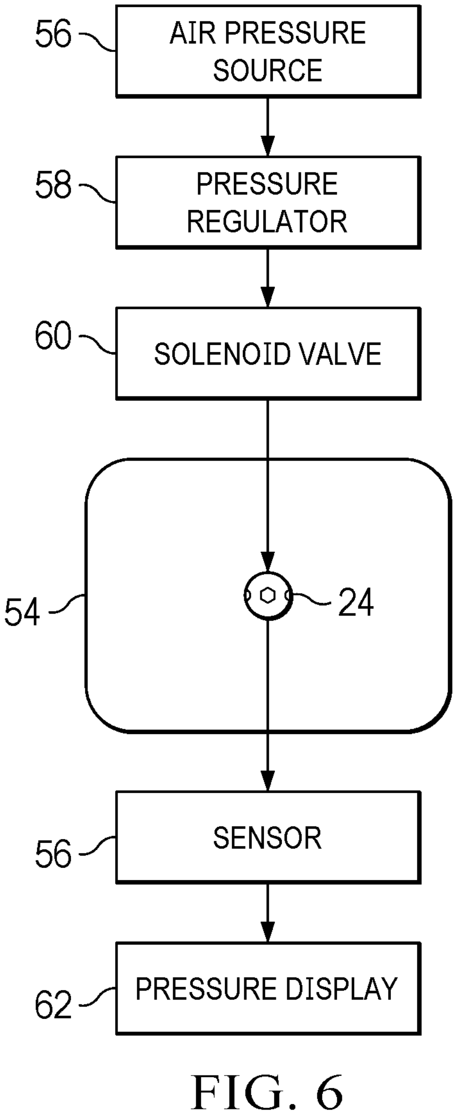
FIG. 6 is an illustration of a flow diagram useful in explaining the operation of the apparatus shown in FIG. 5.
Figure 7:
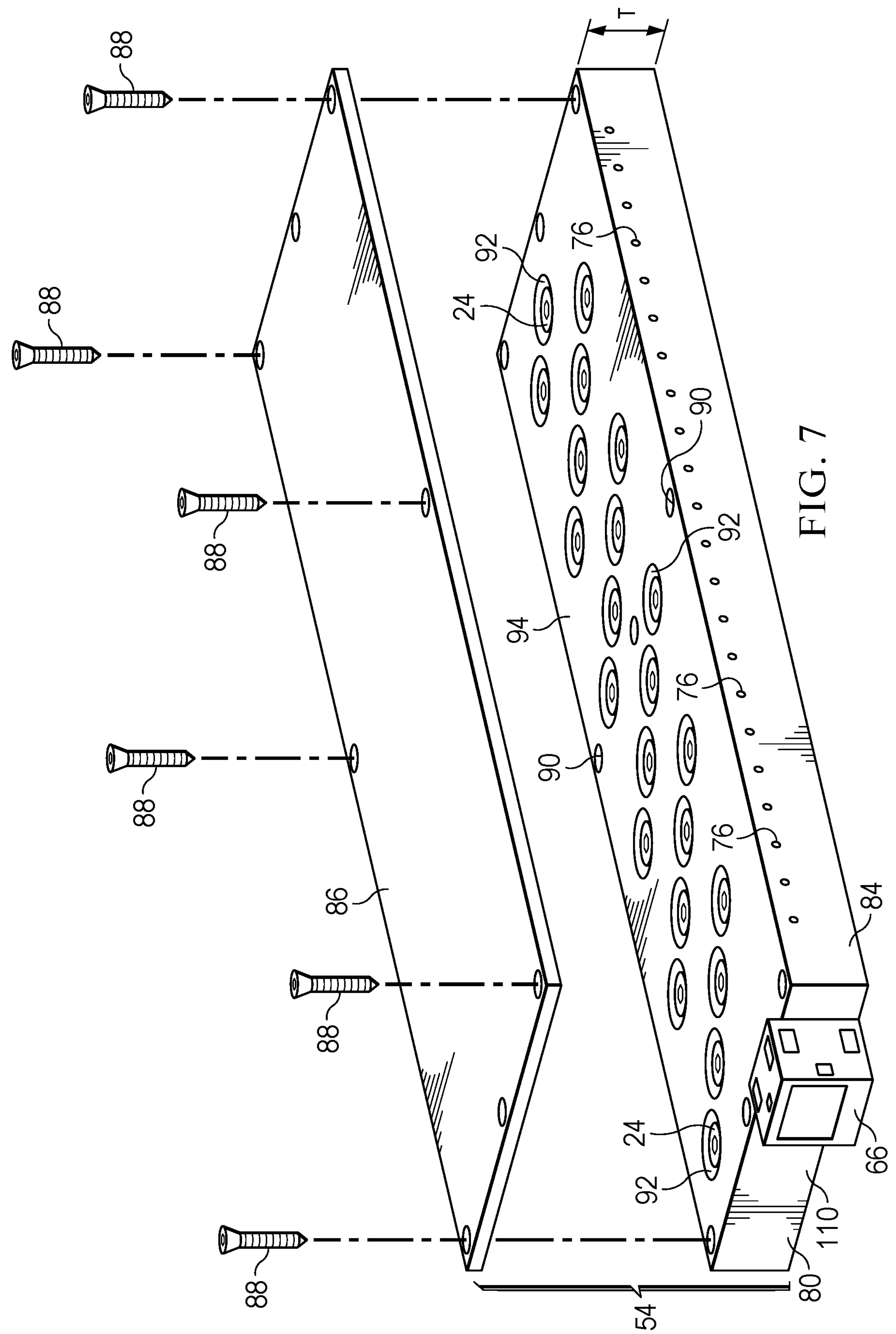
FIG. 7 is an illustration of an exploded, perspective view of a test fixture forming part of the apparatus shown in FIG. 5.

Attention is now directed to FIGS. 5 and 6 which illustrates one embodiment of apparatus for automatically testing a plurality of the vent caps 24. The apparatus comprises a test fixture 54 on which any number of vent caps 24 may be placed for testing, either sequentially or simultaneously. As will be discussed below in more detail, the test comprises applying pressurized air at the inlet 34 of the vent cap 24 and then measuring the air pressure at the outlet 38 to determine whether the valve 44 opens and closes at the correct air pressures. Failure of a valve 44 to open when a preselected pressure is applied at the inlet 34 of the vent cap 24 is an indication that the valve 44 is not operating properly, and the vent cap 24 should be replaced.

Figure 9:
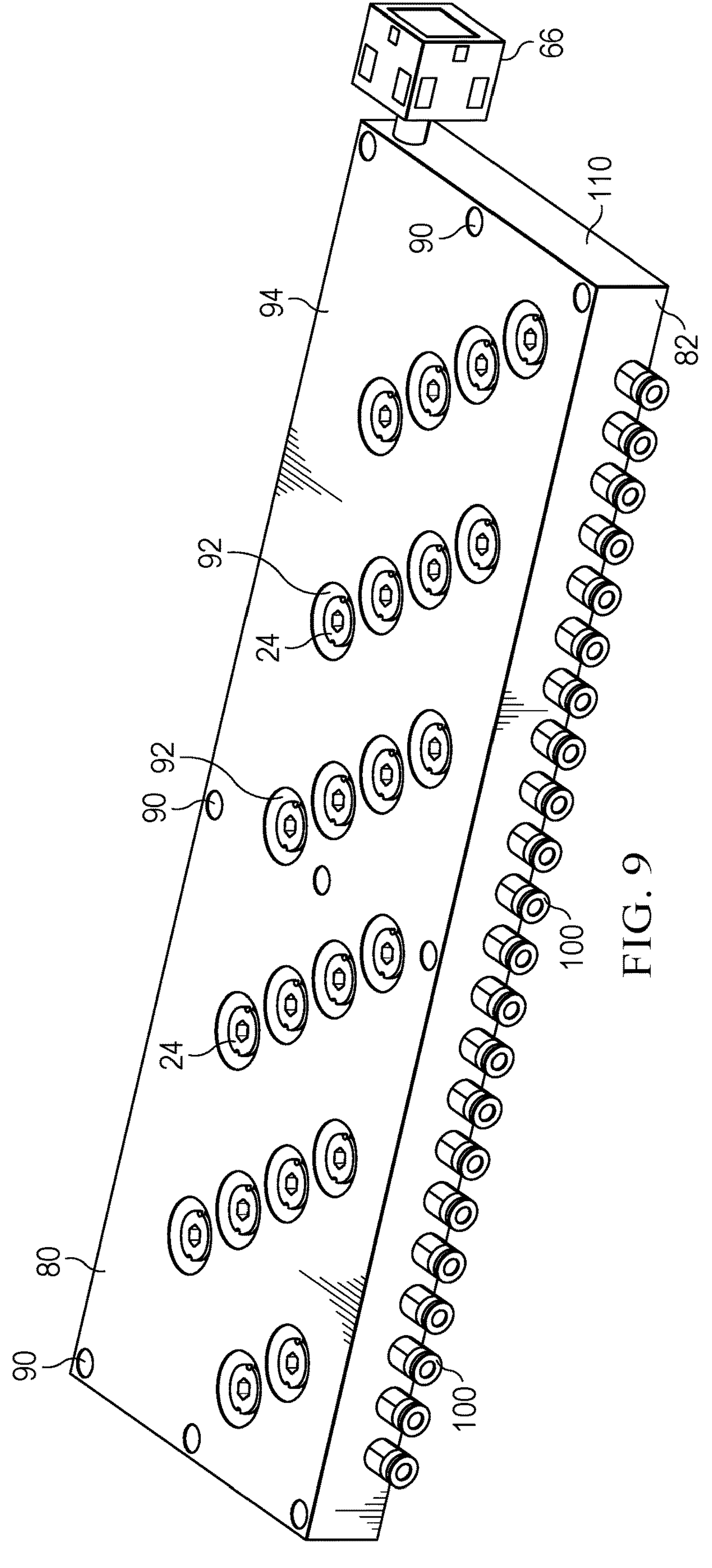
FIG. 9 is an illustration of a front perspective view of the test fixture.

Pressurized air is delivered from an air pressure source 56 to an air regulator 74 which adjusts the air pressure to the desired, preselected value before being delivered by a supply line 64 to the test fixture 54. The pressurized air is routed to a manifold 58 of solenoid valves 60 that are electrically actuated and respectively connected through internal passages (discussed later) in the test fixture 54 to the inlets 34 of the vent caps 24. The outlets 38 of the vent caps 24 are coupled via outlet passages 104 to a common passage 78 that is connected to a pressure sensor and display 66 on an end wall 110 (FIG. 9) of the base 80. The pressure sensor and display 66 both senses and displays the air pressure present in the common passage 78. The pressure sensor and display 66 may be mounted directly on the test fixture 54. An electronic controller 62 such as a PLC (programmable logic controller) or a PC, controls the operation of the air pressure source 56, the air regulator 74 and the solenoid valves 60, based on one or more control programs 68. The control programs 68 contain the preselected test pressures that are to be used for testing a particular type of vent cap 24. More particularly, the control programs 68 contain the air pressures at which the vent caps 24 should open and close. In the example shown in FIGS. 5 and 6, the vent caps 24 are tested sequentially, in any desired order determined by the electronic controller 62 and control programs 68.

In operation, air is delivered at a regulated, preselected value to each of the solenoid valves 60 via supply line 64. The electronic controller 62 then actuates individual ones of the solenoid valves 60 (i.e. sequentially in any order), resulting in pressurized air being delivered to the vent caps 24, one at a time. If a vent cap 24 is operating properly in response to the applied air pressure, its valve 44 will open, which in turn results in an increase in the air pressure at the outlet 38 the vent cap 24. This increase in air pressure at the outlet 38 is sensed by the pressure sensor and display 66 which then delivers a signal to the controller 62 indicating that vent cap 24 being tested is operating (opening) properly. The exact pressures at which the valves 44 open and close are measured and displayed, allowing service personal to verify that the valves 44 are operating properly (i.e. opening and closing at the correct pressures). The apparatus may also include suitable data storage 70 for storing test data as well as I/O (input/output) devices. Any number of vent caps 24 can be tested in the test fixture 54, however as few as a single vent cap 24 may be tested if desired, in the manner described above.

It should be noted here that while the test procedure described above is essentially fully automated, simplified versions of the apparatus are possible which obviate the need for the electronic controller 62. For example, the test pressures can be set by manually adjusting the air regulator 74 using a conventional hand control (not shown). The solenoid valves 60 can be manually actuated by using a set of individual control switches that couple the solenoid valves 60 a power source (all not shown). The user can then observe the pressure sensor and display 66 to decide whether vent cap 24 being tested is operating satisfactorily (i.e. opening and closing at the correct pressures).

Figure 8:
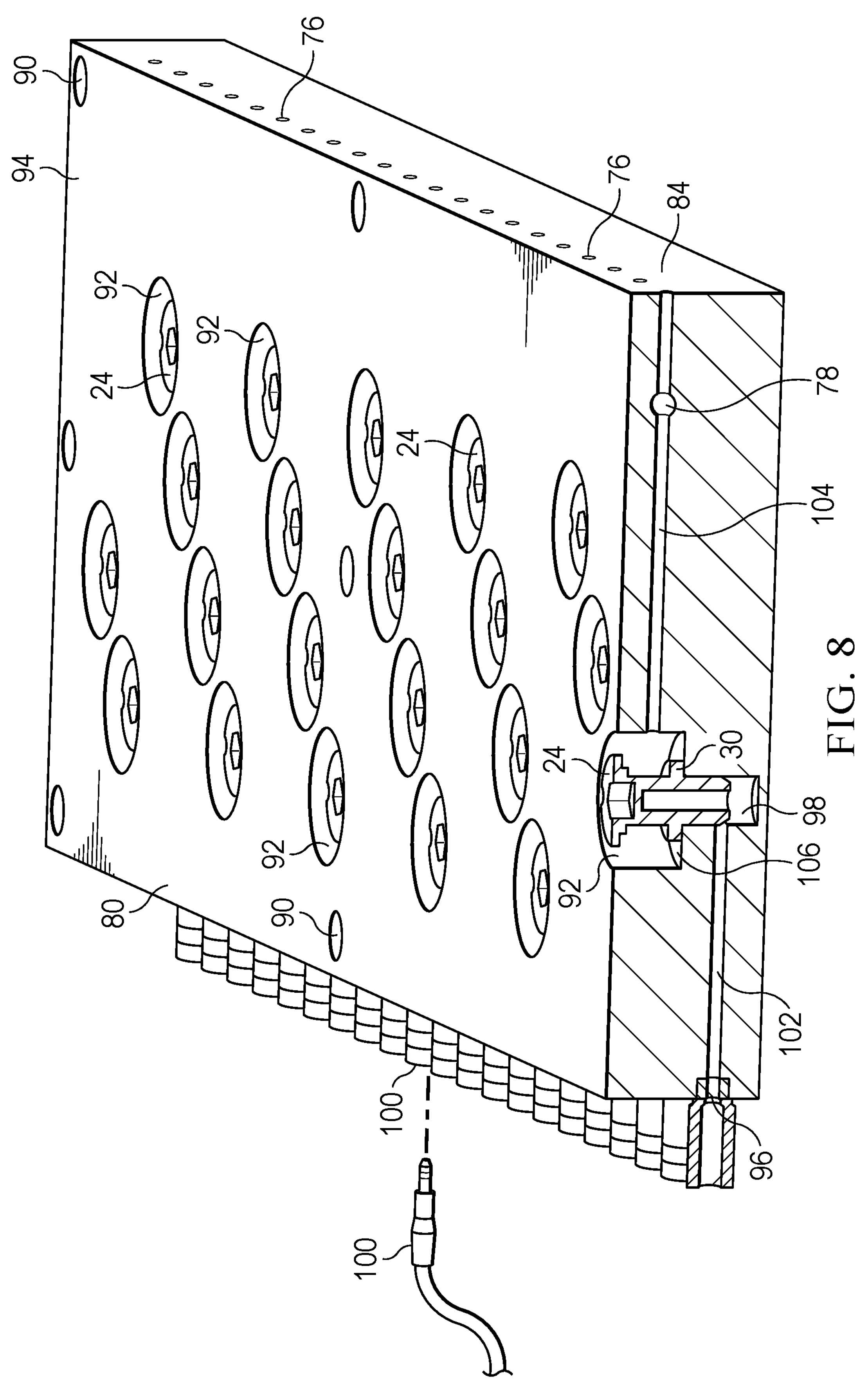
FIG. 8 is an illustration of the test fixture, partially cutaway in cross-section to reveal internal air passages.
Figure 10:
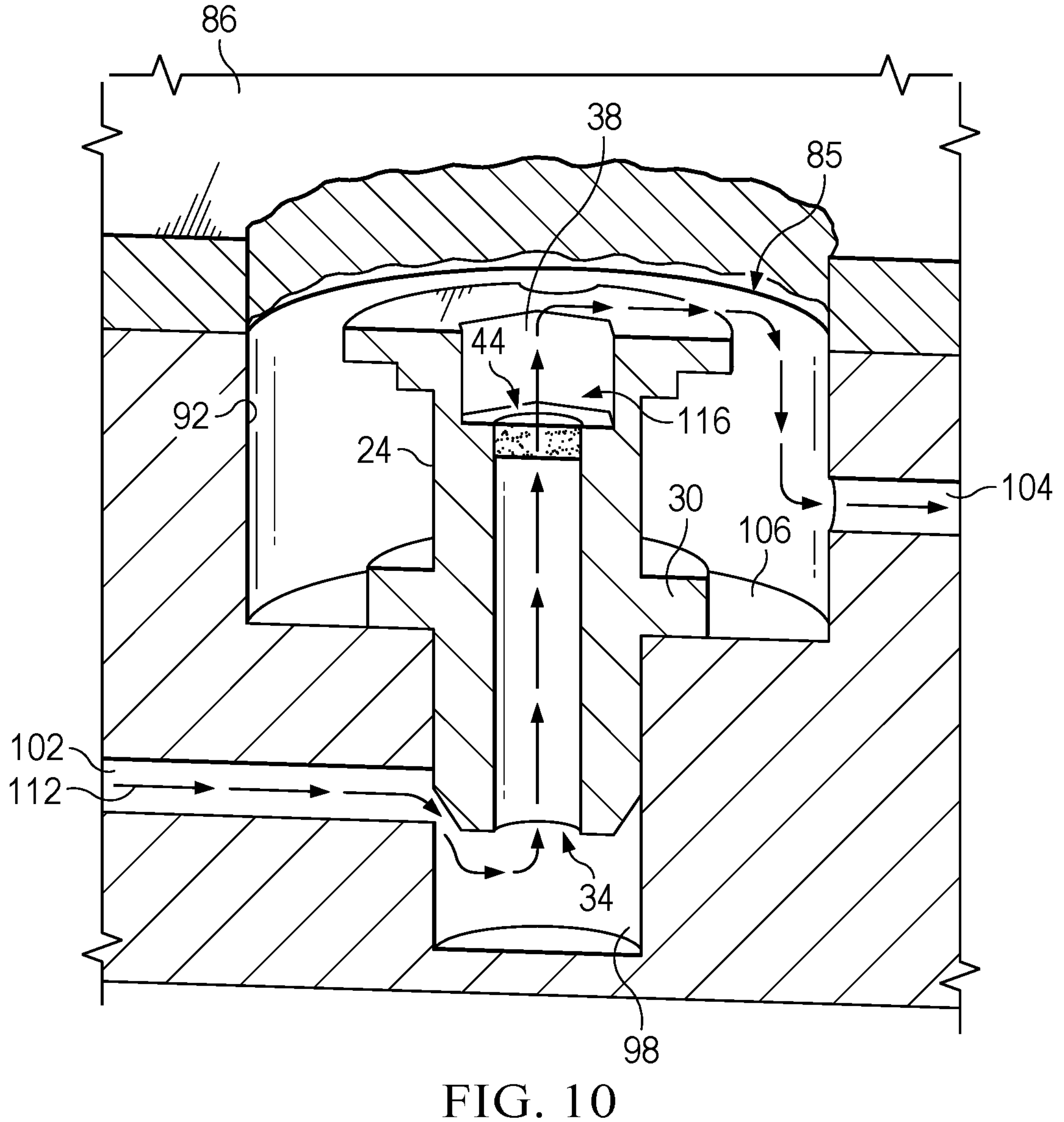
FIG. 10 is an illustration of an enlarged, cross-sectional view showing the airflow path through one of the vent caps.
Figure 11:
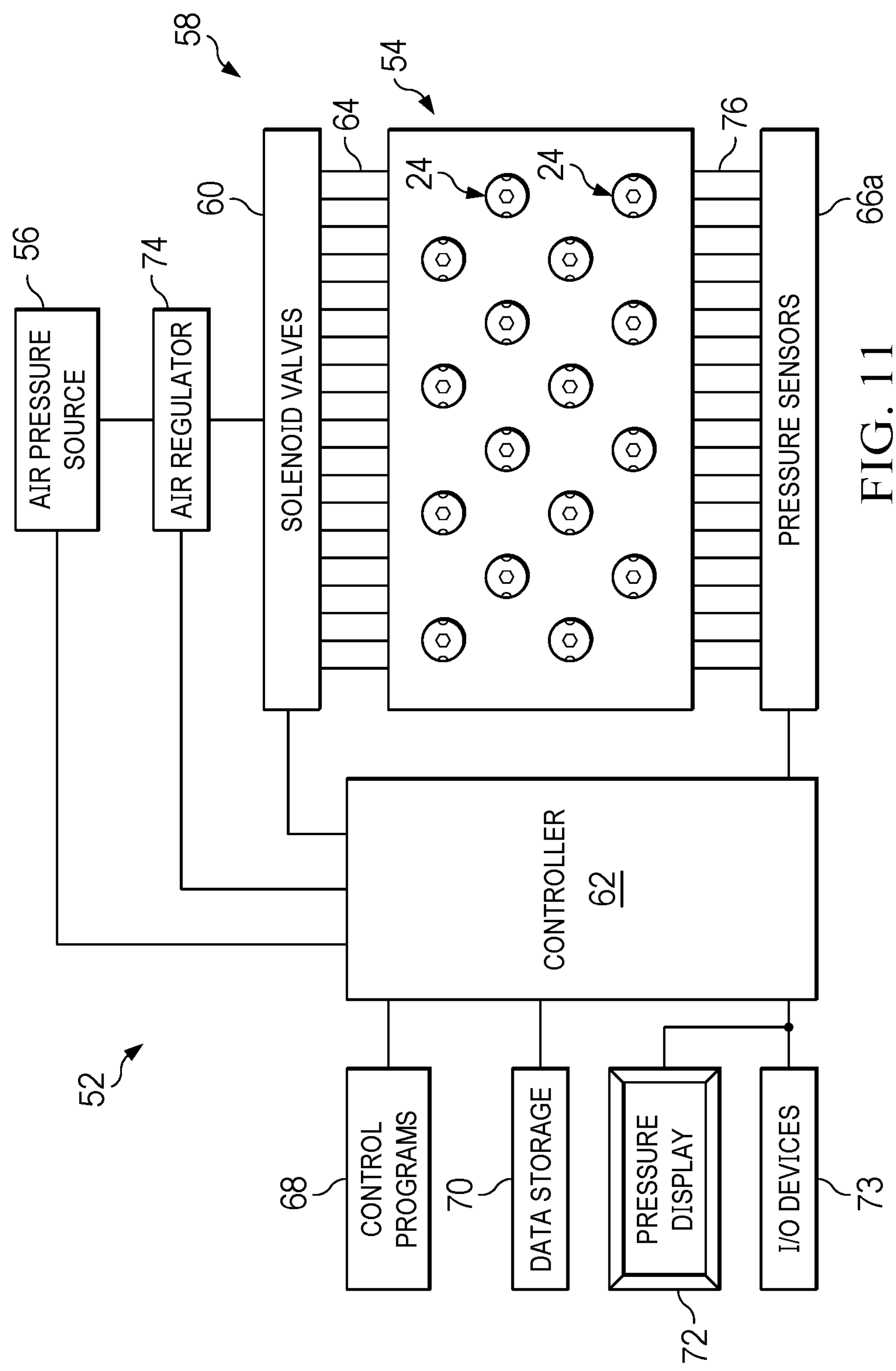
FIG. 11 is an illustration of another example of the apparatus.

FIGS. 7-10 illustrate additional details of the test fixture 54. Test fixture 54 broadly includes a base 80 and a rigid cover plate 86. The base 80 as well as the cover plate 86 may be formed of any suitable rigid materials, manufactured by conventional processes, including additive manufacturing. The cover plate 86 is removably attached to the top 94 of the base 80 using any suitable means such as screws 88, clamps or other quick release devices. Although not shown in the Figures, the cover plate 86 includes a gasket or the like that forms an air tight seal between the cover plate 86 and the base 80. The base 80 is solid, having a suitable thickness T and includes a plurality of cylindrically shaped recesses 92 formed therein into which the vent caps 24 can be placed for testing. When placed in the recesses 92, the caps 28 (FIG. 2) of the vent caps 24 sit below the top of the base 80, forming a gap or open space 85 (FIG. 10) between the vent cap 24 and the cover plate 86. The base 80 includes a plurality of inlet passages 102 extending through the base 80 which are respectively connected to cavities 98 at the bottom of the recesses 92. Outlet passages 104 in the base 80 respectively couple upper regions of the recesses 92 with a common passage 78 which, as previously described is coupled with the pressure sensor and display 66. In an alternate embodiment discussed later, outlet passages 104 extend through the back side 84 of the base 80, forming a series of outlets 76 that are adapted be coupled with individual pressure sensors 66*a* (FIG. 11). As best seen in FIGS. 8 and 10, the recesses 92 have stepped diameters forming a bottom wall 106 on which the shoulders 30 of the vent caps 24 can reset. Pressurized air supplied through the regulator 74 (FIG. 5) is connected to the inlets 96 using quick connect couplings 100 on the front side 82 of the base 80, or other suitable fittings. The recesses 92 can be arranged in any suitable pattern in the base 80, but preferably are arranged in arrays such that the inlet passages 102 and the outlet passages 104 extend straight and are aligned in order to avoid dogleg patterns.

FIG. 10 which illustrates pressurized air flow through the vent cap 24 during testing. Airflow 112 initially passes through the inlet passages 102 into the cavity 98 at the bottom of a recess 92, then enters the inlet 34, flowing upwardly until it reaches the valve 44. When the valve 44 is operating properly, the pressure of the airflow 112 is sufficient to open the valve 44, allowing airflow 112 to exit through the outlet 38 at the top of the vent cap 24. The presence of the open space 85 between vent cap 24 and the cover plate 86 allows airflow to pass through the recess 92 into the outlet passages 104. Depending upon the particular construction of the base 80, the sides of the recess 92 may be threaded (not shown), allowing the vent cap 24 to be threaded into and held in the base 80 during testing.

Attention is now directed to FIG. 11 which illustrates an alternate embodiment of the apparatus which allows a plurality of the vent caps 24 to be tested simultaneously, rather than sequentially as previously described. In this embodiment, similar to that previously described, a manifold 58 of solenoid valves 60 control airflow to the corresponding vent caps 24 that have been placed in the base 80. The solenoid valves 60 may be separate from the base 80, or integrated into the base 80 as previously described. The outlet passages 104 (not shown in FIG. 11) are coupled with pressure sensors 66*a* which respectively sense the pressure in the outlet passages 104, and thus whether or not the valves 44 open and/or close at the correct pressures. The sensed pressures are delivered to an electronic controller 62 for processing and readout on a pressure display 72.

Figure 12:
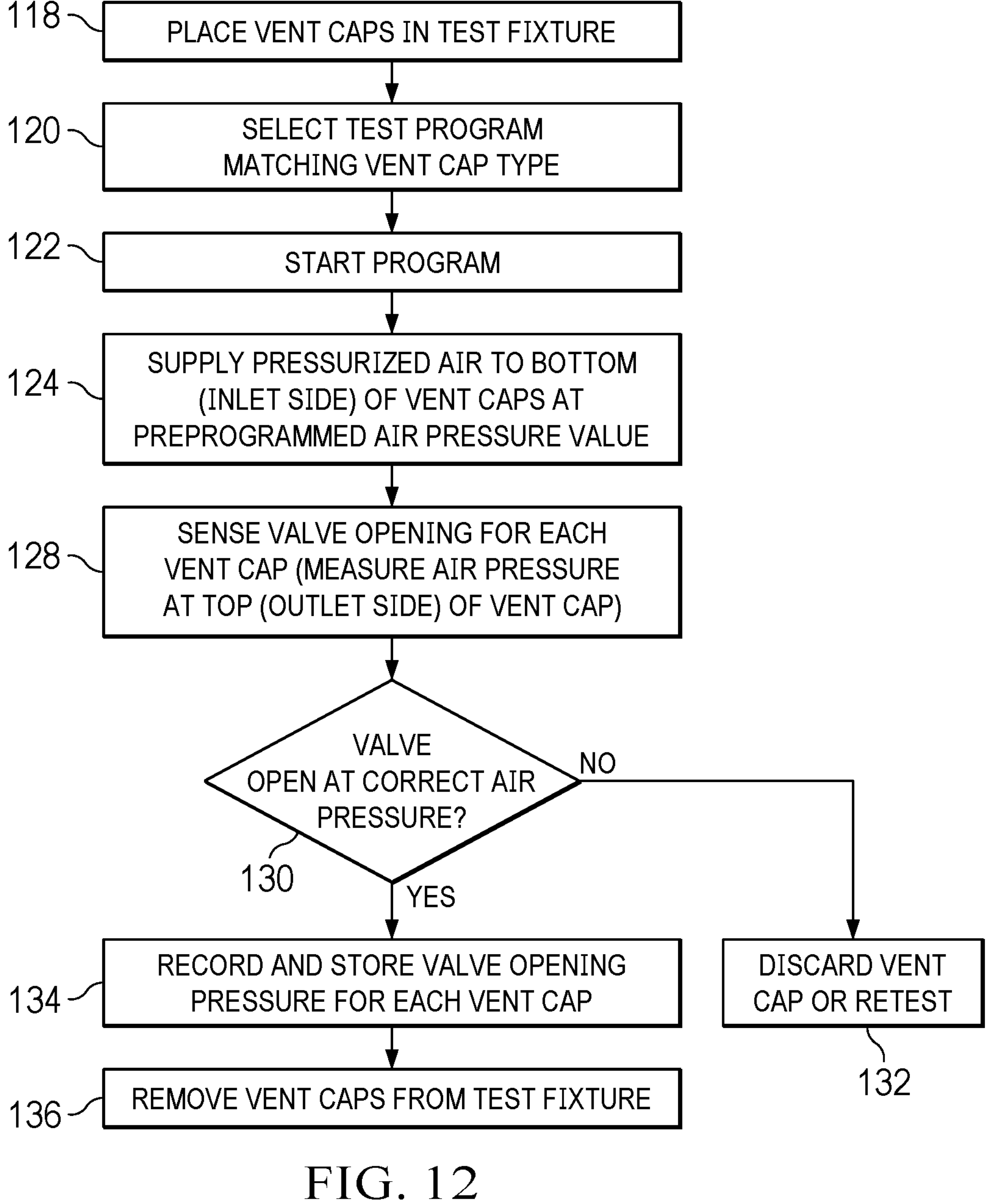
FIG. 12 is an illustration of a flow diagram of a method of testing vent caps.

Attention is now directed to FIG. 12 which broadly illustrates the steps of a method of testing vent caps 24 for proper valve operation. Beginning at 118, the vent caps 24 are placed and sealed within recesses 92 in the base 80, following which the cover plate 86 is installed on the top of the base 80. In those embodiments utilizing automatic control, at 120, a test program matching the vent cap type is selected, following which at 122 the test program is started. At 124, pressurized air is supplied to the inlet 34 (bottom) of the vent caps 24 sequentially or simultaneously depending upon the apparatus configuration. At 128, opening of the valves 44 of the vent caps 24 is sensed through air pressure measurement at the outlet 38 of the vent cap 24. At 130, if the correct air pressure is sensed indicating the valve is operating properly, then the sensed air pressures may be recorded for each vent cap 24 for archival or other purposes, and the vent caps 24 are removed from the test fixture 136. On the other hand, if the valve 44 fails to open at the correct air pressure, at 132, the vent cap 24 is either discarded or retested.

Figure 13:
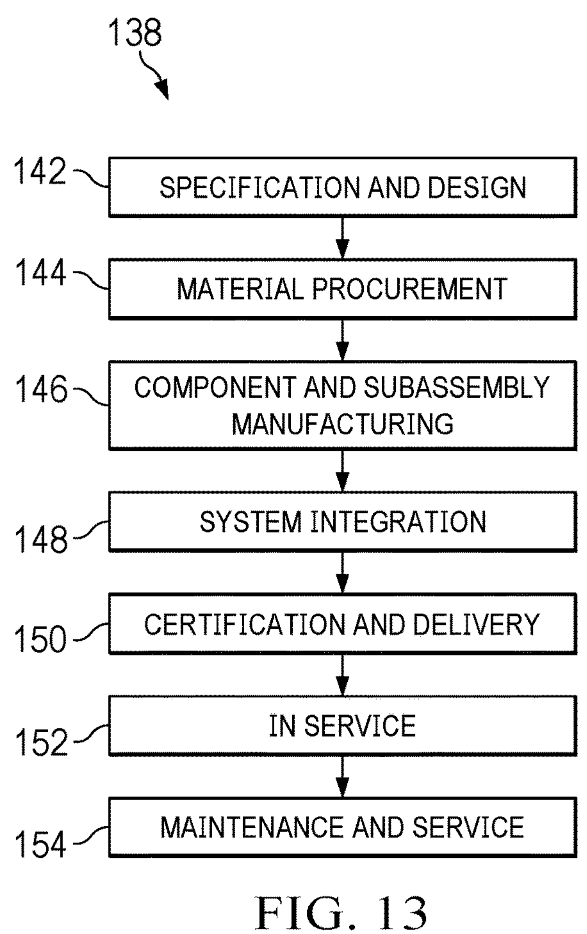
FIG. 13 is an illustration of a flow diagram of aircraft production and service methodology.
Figure 14:
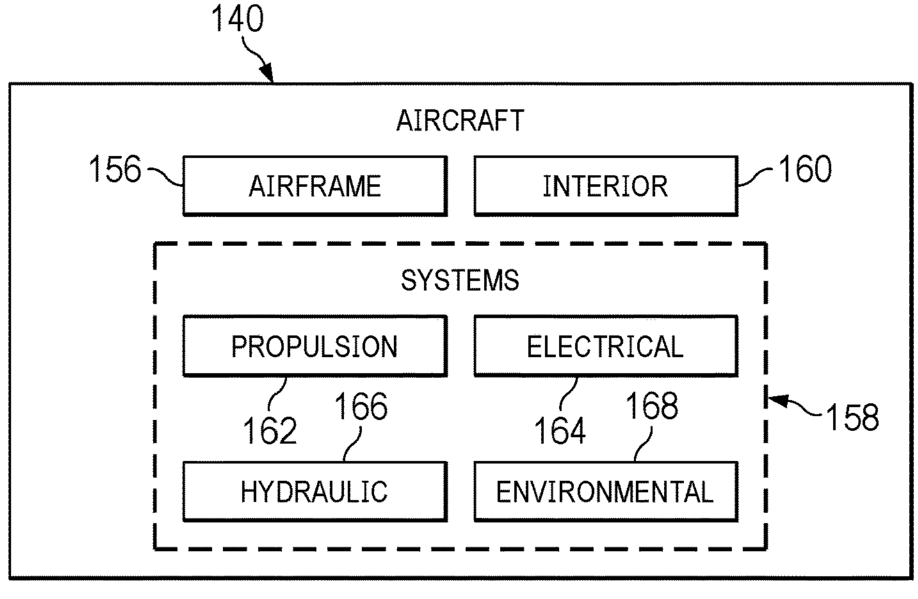
FIG. 14 is an illustration of a block diagram of an aircraft.

Examples of the disclosure may find use in a variety of potential applications, particularly in the transportation industry, including for example, aerospace, marine, automotive applications and other application where electrolyte batteries are employed. Thus, referring now to FIGS. 13 and 14, examples of the disclosure may be used in the context of an aircraft manufacturing and service method 138 as shown in FIG. 13 and an aircraft 140 as shown in FIG. 14. Aircraft applications of the disclosed examples may include a variety of batteries used in various systems of the aircraft. During pre-production, the method 138 may include specification and design 142 of the aircraft 140 and material procurement 144. During production, component and subassembly manufacturing 146 and system integration 148 of the aircraft 140 takes place. Thereafter, the aircraft 140 may go through certification and delivery 150 in order to be placed in service 152. While in service by a customer, the aircraft 140 is scheduled for routine maintenance and service 154, which may also include modification, reconfiguration, refurbishment, and so on.

Each of the processes of method 138 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 140 produced by method 138 may include an airframe 156 with a plurality of high level systems 158 and an interior 160. Examples of high-level systems 158 include one or more of a propulsion system 162, an electrical system 164, a hydraulic system 166 and an environmental system 168. Any number of other systems may be included. Although an aerospace example is shown, the principles of the disclosure may be applied to other industries, such as the marine and automotive industries where batteries are used.

Systems and methods embodied herein may be employed during any one or more of the stages of the aircraft manufacturing and service method 138. For example, components or subassemblies corresponding to component and subassembly manufacturing 146 may be fabricated or manufactured in a manner similar to components or subassemblies produced while the aircraft 140 is in service. Also, one or more apparatus examples, method examples, or a combination thereof may be utilized during the component and subassembly manufacturing 146 and system integration 148, for example, by substantially expediting assembly of or reducing the cost of an aircraft 140. Similarly, one or more of apparatus examples, method examples, or a combination thereof may be utilized while the aircraft 140 is in service, for example and without limitation, to maintenance and service 154.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. Apparatus for testing a vent cap having a valve for controlling an escape of gas, comprising:

a fixture having at least one recess configured to have the vent cap placed therein, the fixture including an inlet configured to couple the vent cap with a source of pressurized air, and an outlet coupled with the vent cap;

a pressure sensor coupled with the outlet and configured to sense opening and closing of the valve;

a base having a top in which the recess is formed, and a cover removably mounted on the base covering the recess, and forming an air tight seal over the recess.

2. The apparatus of claim 1, wherein the base includes:

an inlet passage extending through the base into the recess, and an outlet passage extending through the base between the recess and the pressure sensor.

3. The apparatus of claim 1, wherein the recess includes a bottom wall against which the vent cap can be sealed.

4. The apparatus of claim 1, wherein the pressure sensor is carried on the fixture.

5. The apparatus of claim 4, wherein the pressure sensor includes a display configured to display a value of air pressure at the outlet.

6. The apparatus of claim 5, wherein the display is mounted on the fixture.

7. The apparatus of claim 1, further comprising at least one electrically actuated solenoid valve coupled between the inlet and the source of pressurized air, the solenoid valve being configured to control a delivery of air from the source of pressurized air to the vent cap.

8. The apparatus of claim 7, further comprising a controller coupled with the solenoid valve and configured to automatically actuate the solenoid valve, and control delivery of pressurized air to the inlet.

9. The apparatus of claim 7, wherein the solenoid valve is integrated into the fixture.

10. Apparatus for testing a plurality of vent caps each having a valve for controlling an escape of gas through the vent cap, comprising:

a fixture having a plurality of recesses in which a plurality of vent caps may be respectively placed;

a plurality of inlet passages in the fixture configured to be coupled with a source of pressurized air and respectively coupled with the vent caps;

a plurality of outlet passages in the fixture respectively coupled with the vent caps; and at least one pressure sensor coupled with the outlet passages and configured to sense air pressure within the outlet passages indicating an opening or closing of each of the valves.

11. The apparatus of claim 10, wherein:

the fixture includes a base, and the inlet passages extend through the base.

12. The apparatus of claim 11, wherein the inlet passages and the outlet passages are coupled with the recesses.

13. The apparatus of claim 11, wherein each of the recesses includes a bottom against which one of the vent caps can be sealed.

14. The apparatus of claim 10, further comprising:

a plurality of electrically actuated solenoid valves integrated into the fixture and configured to control the pressurized air supplied to the vent caps through the inlet passages.

15. A method of testing a plurality of vent caps each containing a valve for controlling an escape of gas, comprising:

placing each of a plurality of vent caps on a fixture;

supplying pressurized air to each of the vent caps through the fixture;

sensing a pressure at which the valves each of the vent caps opens; and sealing each of the vent caps inside the fixture.

16. The method of claim 15, wherein supplying pressurized air includes directing pressurized air through passages within the fixture.

17. The method of claim 15, wherein supplying pressurized air and sensing a pressure is performed automatically by an electronic controller.

18. The method of claim 15, wherein sensing a pressure is carried out on the fixture and includes displaying a value of the pressure that has been sensed.

* * * * *